United States Patent [19]

Fraser, Jr. et al.

[11] Patent Number: 5,247,736
[45] Date of Patent: Sep. 28, 1993

[54] METHOD OF MANUFACTURING A MILTIPIECE ECCENTRIC SHAFT

[75] Inventors: Howard H. Fraser, Jr.; David C. Baumann, both of Lafayette, N.Y.

[73] Assignee: Carrier Corporation, Syracuse, N.Y.

[21] Appl. No.: 713,194

[22] Filed: Jun. 10, 1991

Related U.S. Application Data

[63] Continuation-in-part of Ser. No. 444,944, Nov. 28, 1989, Pat. No. 5,026,262.

[51] Int. Cl.⁵ .............................................. B23P 15/00
[52] U.S. Cl. .................. 29/888.022; 29/428; 418/55.1
[58] Field of Search ........................ 29/888.022, 428; 418/55.1, 55.6, 94, 151; 464/181, 183; 417/410; 184/6.18

[56] References Cited

U.S. PATENT DOCUMENTS

| | | | |
|---|---|---|---|
| 4,488,855 | 12/1984 | Butterworth et al. | 418/94 |
| 4,704,918 | 11/1987 | Orkin et al. | 464/181 |
| 4,762,478 | 8/1988 | Sakurai et al. | 418/151 |

FOREIGN PATENT DOCUMENTS

| | | |
|---|---|---|
| 0054937 | 6/1982 | European Pat. Off. ............ 464/181 |
| 0157390 | 10/1985 | European Pat. Off. . |
| 55-72685 | 5/1980 | Japan ..................... 418/94 |
| 57-181984 | 11/1982 | Japan . |
| 58-174176 | 10/1983 | Japan . |
| 58-174180 | 10/1983 | Japan . |
| 60-119389 | 6/1985 | Japan . |
| 63-80090 | 4/1988 | Japan . |
| 2133836 | 8/1984 | United Kingdom . |

*Primary Examiner*—Irene Cuda

[57] ABSTRACT

A drive shaft having a main bearing portion, formed by metal forging, casting or powdered metallurgy, and having coupled thereto a rotor stub portion comprising a steel tube fixedly secured to the main bearing portion, such as by press fitting, friction or laser welding. The rotor stub portion of the drive shaft contains an insert formed with suitable oil hole passages to deliver oil through the rotor stub portion to any desired location along this portion of the drive shaft.

11 Claims, 2 Drawing Sheets

METHOD OF MANUFACTURING A MILTIPIECE ECCENTRIC SHAFT

This application is a continuation-in-part of application Ser. No. 444,944, filed Nov. 28, 1989, now U.S. Pat. No. 5,026,262.

BACKGROUND OF THE INVENTION

The present invention relates in general to drive shafts and, in particular, to an improved construction for a drive shaft which reduces manufacturing costs and provides greater latitude in manufacturing techniques.

This invention is especially suitable for use in a scroll compressor wherein a pair of mating scrolls undergo relative orbital movement. In such compressors one scroll is normally held fixed and the other is orbited. A compressible fluid, such as a refrigerant gas, is introduced at the side of the spiral wraps and is compressed as the gas moves under the orbiting motion of the device. The compressed gas is then discharged at the center. By reversing the process, introducing compressed fluid at the center and permitting the fluid expansion to drive the device, a scroll machine can be used as a motor or expander.

Because the orbiting motion of the moving scroll is unbalanced and off axis, a vibrating moment is created which must be appropriately balanced by a suitable counterweight. Current designs for scroll compressors, or other scroll-type rotating machines, require that the counterweight be positioned a considerable axial distance away from the orbiting scroll that the counterweight is intended to counterbalance. Such counterweights are carried by the drive shaft, but fabricating a drive shaft which includes a mounted counterweight by known manufacturing techniques is expensive. Such existing fabrication processes include machining a single cast piece of gray or ductile iron or machining the drive shaft from a forging. Regardless of which of these basic fabrication processes are utilized, the drive shaft must be machined from a single, substantially homogeneous, piece of material thereby requiring substantial manufacturing costs.

SUMMARY OF THE INVENTION

It is, therefore, an object of this invention to improve the fabrication of drive shafts.

A further object of this invention is to improve the fabrication of drive shafts having a counterweight as a part of the drive shaft.

Still another object of this invention is to improve the manufacturability of a drive shaft for use in a scroll compressor or motor wherein a counterweight is an integral part of the drive shaft or is secured to the drive shaft.

It is a further object of the invention to provide a plastic insert defining oil passages therein and locatable in a drive shaft.

These and other objects are attained in accordance with the present invention wherein there is provided a drive shaft having a main bearing portion, formed by metal forging, casting or powdered metallurgy, and having coupled thereto a rotor stub portion comprising a steel tube fixedly secured to the main bearing portion, such as by press fitting, friction or laser welding. A plastic insert is located in the steel tube and is formed with suitable vent and oil hole passages to vent outgassed refrigerant and to deliver oil through the rotor stub portion to any desired location along this portion of the drive shaft.

DESCRIPTION OF THE DRAWINGS

For a fuller understanding of the present invention, reference should now be made to the following detailed description thereof taken in conjunction with the accompanying drawings wherein.

DESCRIPTION OF A PREFERRED EMBODIMENT

Figure 1:
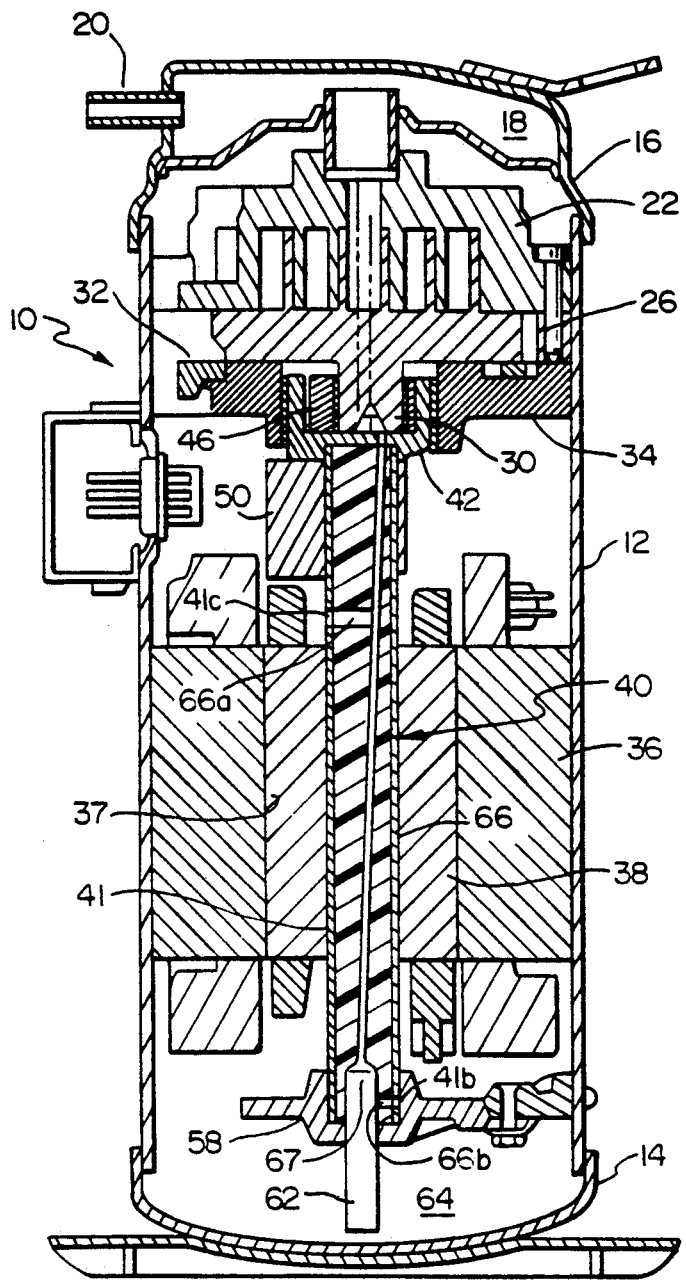
FIG. 1 is a vertical, sectional view of a scroll compressor employing a drive shaft made according to the teachings of the present invention.

While the invention is believed to have a number of applications, for convenience of illustration in describing the best mode presently contemplated for carrying out this invention, the drive shaft is described with reference to its use in a scroll compressor 10 such as is shown in FIG. 1. Scroll compressor 10 has a fixed scroll 22 mounted in shell or housing 12, and an orbiting scroll 26 which is fixed against rotation by Oldham coupling 32. The shell 12 is closed at its upper end with an upper cap 16 and at its lower end with a lower cap 14. Pressure chamber 18 receives gas that is compressed in the compressor and conducts it to a high pressure outlet or discharge 20 after exiting from the center of the fixed scroll which is rigidly mounted within the housing 12. A male stub or stem 30 depends from the orbiting scroll 26 and is engaged by a portion of a drive shaft 40 to be hereinafter described in detail. The orbiting scroll 26 is fixed against rotation by means of an anti-rotation device, such as an Oldham ring or coupling 32 which prevents rotation of the orbiting scroll 26, but permits the orbiting scroll 26 to revolve without rotation around the center or axis of the fixed scroll 22.

An electric motor drive for the compressor 10 is carried within the compressor housing 12 and includes a stator 36 having a cylindrical passage 37 formed therethrough to receive a rotor assembly 38 rotatably journaled within the compressor housing 12. The rotor 38 is positioned within the generally cylindrical passage 37 formed in the stator 36 resulting in a small annular gap therebetween. Relative motion between the fixed scroll 22 and the orbiting scroll 26 is provided through drive shaft 40 which has the rotor 38 press fit thereonto. The drive shaft 40 has a generally cylindrically shaped upper bearing cap 42 located at the upper end of the drive shaft 40. Slider block 46 is received in bearing cap 42 and is adapted to receive the stem portion 30 of the orbiting scroll 26. In this manner rotational motion of the rotor 38 within the stator 36 will cause rotary movement of drive shaft 40 and the slider block 36. Since stem 30 is eccentrically located in slider block 46 relative to the axis of drive shaft 40, rotation of drive shaft 40 will effect an orbiting motion of the orbiting scroll 26 relative to the fixed scroll 22. The bearing cap 42 is journaled within upper bearing 34.

Because the orbiting motion of the orbiting scroll 26 is unbalanced, a counterweight 50 is positioned on the drive shaft 40 immediately axially adjacent the bearing cap 42. Preferably, the counterweight 50 is arcuate in form, in the shape of a segment of a cylinder subtending an arc of approximately 160°, and disposed to the side opposite the radial position of the offset of the orbiting scroll 26. The counterweight 50 may be formed as an integral part of the bearing cap 42 or as a separate piece which is then preferably secured thereto to form an integral unit. Preferably, the counterweight 50 lies at or within the radius of the cylindrical passage 37 in the stator 36 to permit the drive and rotor assembly to be installed from below after the stator 36 has been secured within the housing 12.

Figure 2:
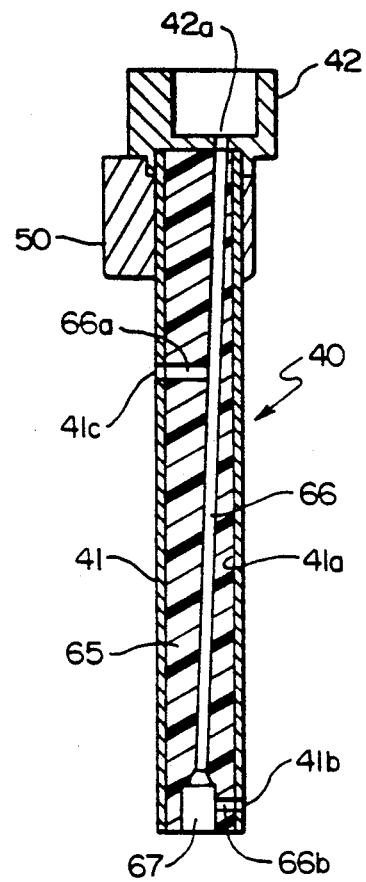
FIG. 2 is a sectional view of the drive shaft of FIG. 1.
Figure 3:
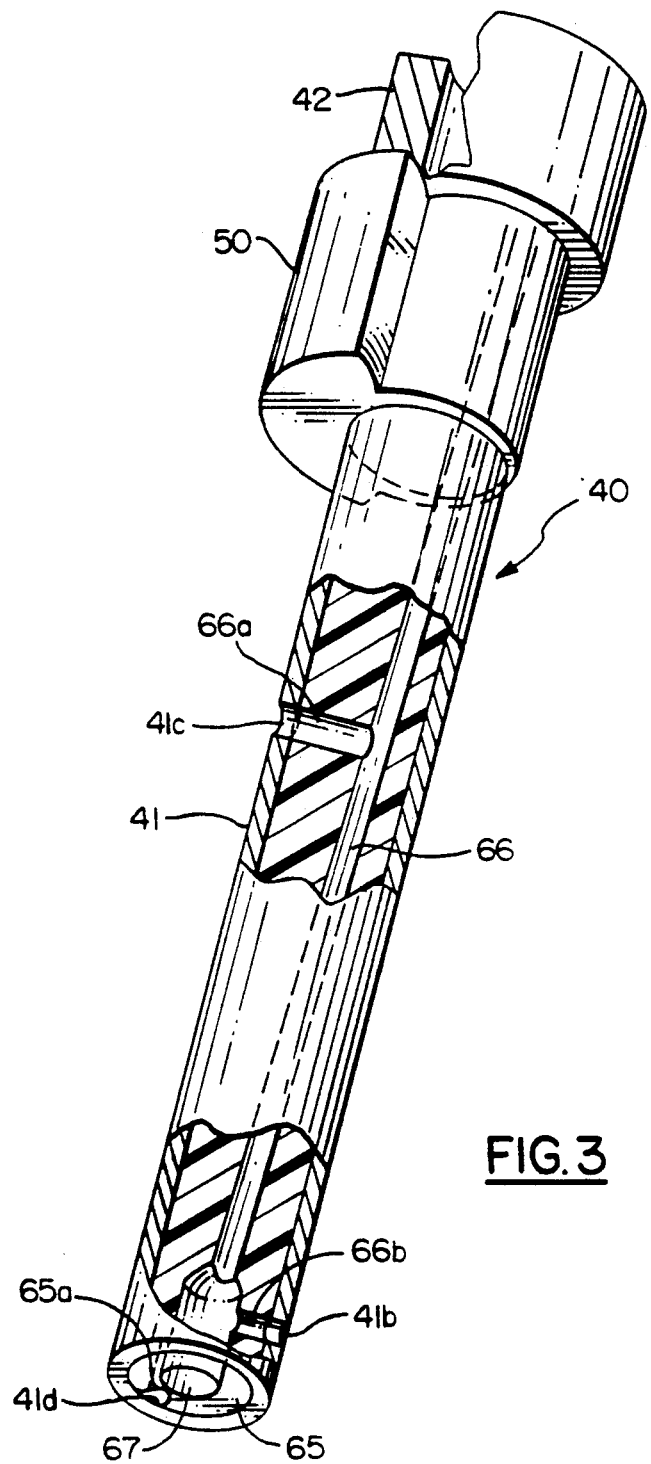
FIG. 3 is a perspective view of the drive shaft of FIG. 1.

Referring now to FIGS. 2 and 3, in assembling drive shaft 40, bearing cap 42 is preferably formed as a single or separate metal forging, casting or powdered metal piece including counterweight 50. Alternatively, if formed separately, the counterweight 50 is preferably secured to bearing cap 42 to form an integral unit. The shaft portion or rotor stub 41 is preferably formed as a steel tube which is either press fit, friction or laser welded to the integral bearing cap 42 and counterweight 50.

Bearing cap 42 and counterweight 50 can be fabricated from a near net shape powdered metal process which will greatly reduce the machining time normally associated with assembling this portion of the drive shaft 40. Because rotor stub portion 41 of the drive shaft 40 is made from a steel tube it will require no machining for assembly and can be readily attached to this main bearing portion defined by cap 42 and integral counterweight 50 by the above-identified process which eliminates the time consuming and expensive machining processes heretofore required.

Plastic insert 65 is injection molded from any one of a number of suitable thermoset engineering plastic materials that are commonly used in an oil/refrigerant type of environment found inside of refrigeration compressors. All of the vent and oil passages can be molded in insert 65. However, a secondary operation of drilling holes may be performed to produce some or all of the vent and oil passages based upon factors such as tooling costs, production volumes and the complexity of the vent and oil/lubrication passages. Injection molded plastic insert 65 is then deburred and cleaned to appropriate specifications dictated by the ultimate use. If necessary or desired, as where made at a different facility, the insert 65 is packaged so that it can be used, as received, at the compressor assembly facility.

Once bearing cap 42 and integral counterweight 50 are assembled to/machined into tube portion 41 and the resultant assembly is cleaned, insert 65 can be inserted into bore 41a of tube portion 41 of drive shaft 40. This would normally be a light press/interference fit and the insertion process could be facilitated by heating drive shaft 40, inserting insert 65 into the heated tube portion 41 and allowing tube 41 to shrink around it. Adhesive could also be used in place of a press fit. Upon insertion, correct alignment of insert 65 to bearing cap 42 must be maintained in order to properly direct the oil/lubricant flow. This alignment can be maintained by fixturing so that oil distribution bore 66 is aligned with port 42a in bearing cap 42, vent port 41c and lubrication port 41b in tube 41. Alternatively, as best shown in FIG. 3, an axially directed alignment slot 65a may be molded into insert 65 so as to engage a corresponding upset 41d in tube 41 in the nature of a slot and key. If adhesive is used, a curing/heat cycle may be required depending upon the adhesive used. Oil pickup tube 62 is then pressed into or adhesively bonded in chamber 67 which defines the lower end of bore 66.

When assembled as described, the lower end of the drive shaft 40 is supported in a lower bearing 58 which journals the lower end of the drive shaft 40 in a position in fluid communication with an oil sump or reservoir 64 which provides a source of lubrication oil for the various bearing surfaces. Oil pick-up tube 62 extends from chamber 67 in the lower end of the drive shaft 40 and is immersed in the sump 64. Oil distribution bore 66 extends in a diverging relationship to the axis of tube 41 and insert 65 from chamber 67 formed in the lower end of the insert 65, over the length of the drive shaft 40 to opening 42a in bearing cap 42 which defines an oil receiving chamber. The oil distribution bore 66 slants at an angle to the axis of rotation of drive shaft 40 so as to be situated on the side opposite to the position of the counterweight 50. The slanting or diverging of bore 66 permits it to act as a centrifugal pump for pumping lubricant. A suitable number of oil distribution channels such as 66b and corresponding port 41b and vent channel 66a and corresponding port 41c connect with the oil distribution bore 66 to provide venting and lubrication to the upper and lower bearings, as well as any other location where lubrication may be required, through centrifugal action upon rotation of the rotor 38 and drive shaft 40 as a unit. The use of channels such as 66a and 66b and their corresponding ports 41b and 41c eliminates the need to bore and drill the drive shaft as previously necessary. Or, alternatively only bore 66 and opening 42a may be initially formed with channels 66a and 66b and ports 41b and 41c being formed after insert 65 is in place.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. For example, a requirement for a greater or lesser mass of the counterweight 50 may require it to be of a different material than the bearing cap 42. Therefore, it is intended that the invention not be limited to the particular embodiment illustrated by the drawings and described in the specification as the best mode presently contemplated for carrying out this invention, but that the invention will include any embodiment falling within the description of the appended claims.

What is claimed is:

1. A method of manufacturing a drive shaft for use in a scroll compressor comprising the steps of:
    forging a metal bearing cap for receiving a portion of an orbiting scroll to impart an orbiting motion thereto;
    fixedly securing said metal bearing cap forging to a steel tubular rotor shaft; and
    forming an oil channel in said rotor shaft for communicating oil to predetermined positions within said rotor shaft by placing an insert containing oil distribution means into said tubular rotor shaft so as to extend essentially the full length of said tubular rotor shaft.

2. The method of claim 1 further including the step of securing a counterweight to said tube rotor shaft.

3. The method of claim 1 wherein said rotor shaft is fixedly secured to said forged bearing cap by either pressing or friction or laser welding.

4. A method of manufacturing a drive shaft for use in a scroll compressor comprising the steps of:
  casting a metal bearing cap for receiving a portion of an orbiting scroll to impart an orbiting motion thereto;
  fixedly securing said metal bearing cap casting to a steel tubular rotor shaft; and
  forming an oil channel in said rotor shaft for communicating oil to predetermined positions within said rotor shaft by placing an insert containing oil distribution means into said tubular rotor shaft so as to extend essentially the full length of said tubular rotor shaft.

5. The method of claim 4 further including the step of securing a counterweight to said tube rotor shaft.

6. The method of claim 4 wherein said metal bearing cap casting is fixedly secured to said rotor shaft by either pressing or friction or laser welding.

7. A method of manufacturing a drive shaft for use in a scroll compressor comprising the steps of:
  forming a bearing cap;
  securing said bearing cap to one end of a tube;
  inserting a plastic insert having at least one oil distribution passage formed therein into said tube so as to extend essentially the full length of said tube such that said passage is in fluid communication with a second end of said tube; and
  securing said insert in said tube.

8. The method of claim 7 further including the subsequent step of forming additional passages in said tube and insert.

9. The method of claim 8 further including the step of inserting and securing an oil pickup tube in said at least one passage.

10. The method of claim 7 further including the steps of:
  forming a counterweight; and
  securing said counterweight to said tube.

11. The method of claim 10 wherein said counterweight is made integral with said bearing cap and secured to said tube therewith as a unit.

* * * * *